US012619851B2

(12) United States Patent　　　　(10) Patent No.:　US 12,619,851 B2
Ikarashi　　　　　　　　　　　　　　　　(45) Date of Patent:　　　May 5, 2026

(54) LABELED MOLDED BODY

(71) Applicant: YUPO CORPORATION, Tokyo (JP)

(72) Inventor: Takuya Ikarashi, Ibaraki (JP)

(73) Assignee: YUPO CORPORATION, Tokyo (JP)

( * ) Notice: Subject to any disclaimer, the term of this patent is extended or adjusted under 35 U.S.C. 154(b) by 0 days.

(21) Appl. No.: 19/018,013

(22) Filed: Jan. 13, 2025

(65) Prior Publication Data

US 2025/0190740 A1　　Jun. 12, 2025

Related U.S. Application Data

(63) Continuation of application No. PCT/JP2024/005474, filed on Feb. 16, 2024.

(30) Foreign Application Priority Data

Sep. 7, 2023　(JP) ................................. 2023-145562

(51) Int. Cl.
　　*G06K 19/06*　　　　(2006.01)
　　*G06K 19/077*　　　(2006.01)
　　　　　　(Continued)
(52) U.S. Cl.
　　CPC ........... *G06K 19/0776* (2013.01); *G09F 3/04* (2013.01); *G09F 2003/0257* (2013.01)
(58) Field of Classification Search
　　CPC ............. G06K 19/07749; G06K 19/07; G06K 19/07722; G06K 19/041; G06K 19/077;
　　　　　　(Continued)

(56) References Cited

U.S. PATENT DOCUMENTS 10,336,920 B2　7/2019　Ellis et al.
2021/0096003 A1*　4/2021　Kang ........................ C23C 4/11
　　　　　　(Continued)

FOREIGN PATENT DOCUMENTS

CN　　　102378985　　*　3/2012　....... G06K 19/07749
JP　　　2006-48016　　　2/2006
　　　　　　(Continued)

OTHER PUBLICATIONS

International Search Report issued in International Application No. PCT/JP2024/005474, dated Apr. 16, 2024, and English language translation thereof.

*Primary Examiner* — Daniel St Cyr
(74) *Attorney, Agent, or Firm* — Greenblum & Bernstein, P.L.C.

(57)　　　　　ABSTRACT

Provided is a labeled molded body which enables a label and an RFID member to be easily separated from a molded body and to be each recycled and whose production process is simple. A labeled molded body includes a molded body and a label disposed on a surface of the molded body, and further having an RFID member disposed between the molded body and the label, wherein the molded body includes a thermoplastic resin at least in a surface layer, the label has a substrate layer including a thermoplastic resin, adhesive strength between the molded body and the RFID member $(P_{molded\ body-member})$ is 100 gf/15 mm or less and is equal to or less than adhesive strength between the RFID member and the label $(P_{member-label})$, and adhesive strength between the molded body and the label $(P_{molded\ body-label})$ is 90 to 300 gf/15 mm.

13 Claims, 3 Drawing Sheets

(51) Int. Cl.
　　*G09F 3/04* 　　　　(2006.01)
　　*G09F 3/02* 　　　　(2006.01)

(58) Field of Classification Search
　　CPC ........ G06K 19/07745; G06K 19/07747; G09F
　　　　　　　　　　　　3/04; G09F 3/00; G09F 3/0335
　　USPC ........................................ 235/488, 487, 492
　　See application file for complete search history.

(56) References Cited

U.S. PATENT DOCUMENTS

2023/0086189 A1 *　3/2023　Finn ................. G06K 19/07794
　　　　　　　　　　　　　　　　　　　　235/488
2024/0359388 A1　10/2024　Nitta

FOREIGN PATENT DOCUMENTS

| | | | | |
|---|---|---|---|---|
| JP | 2006-139326 | 6/2006 | | |
| JP | 2006-202169 | 8/2006 | | |
| JP | 2007-256566 | 10/2007 | | |
| JP | 2008-299053 | 12/2008 | | |
| JP | 2016-505700 | 2/2016 | | |
| JP | 2020-118908 | 8/2020 | | |
| JP | 2021-31104 | 3/2021 | | |
| JP | 2023-46872 | 4/2023 | | |
| WO | 2006041033 | * | 4/2006 | ....... G06K 19/07718 |
| WO | 2015182435 | * | 12/2015 | .............. B32B 7/06 |

* cited by examiner

[Fig. 1]
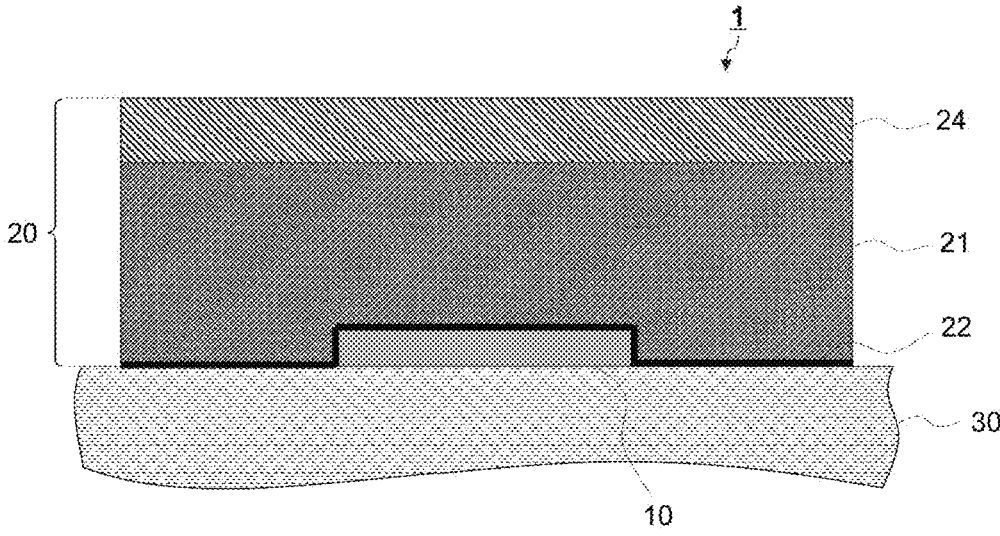
[Fig. 2]
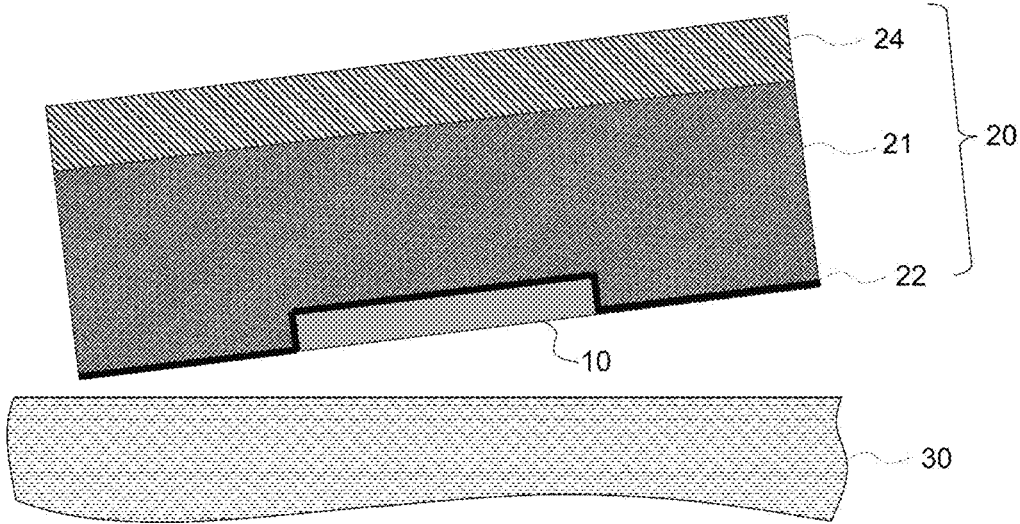

[Fig. 3]
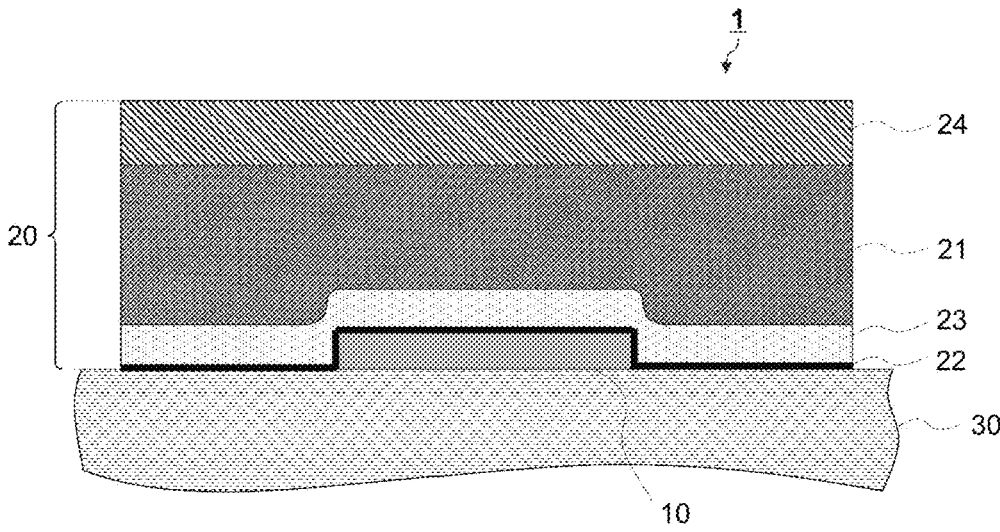
[Fig. 4]
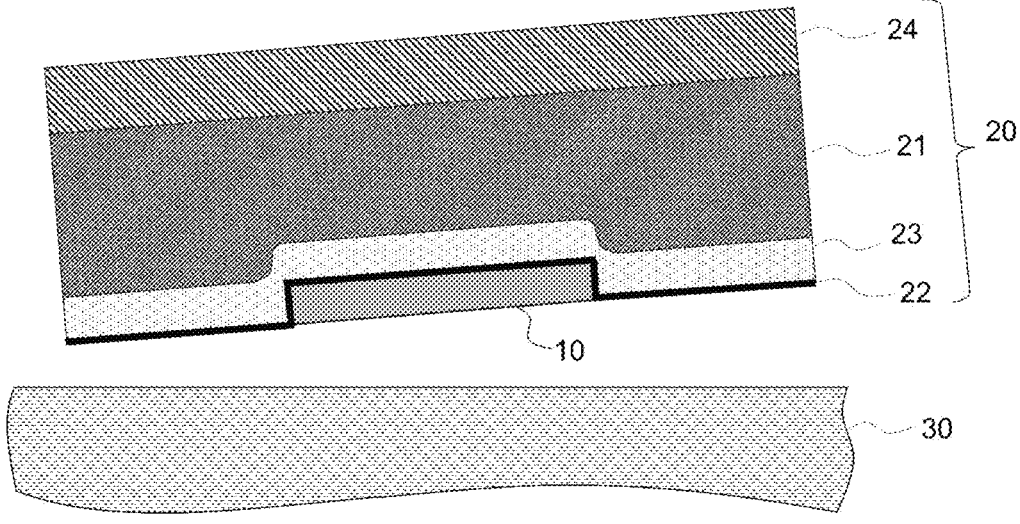

[Fig. 5]
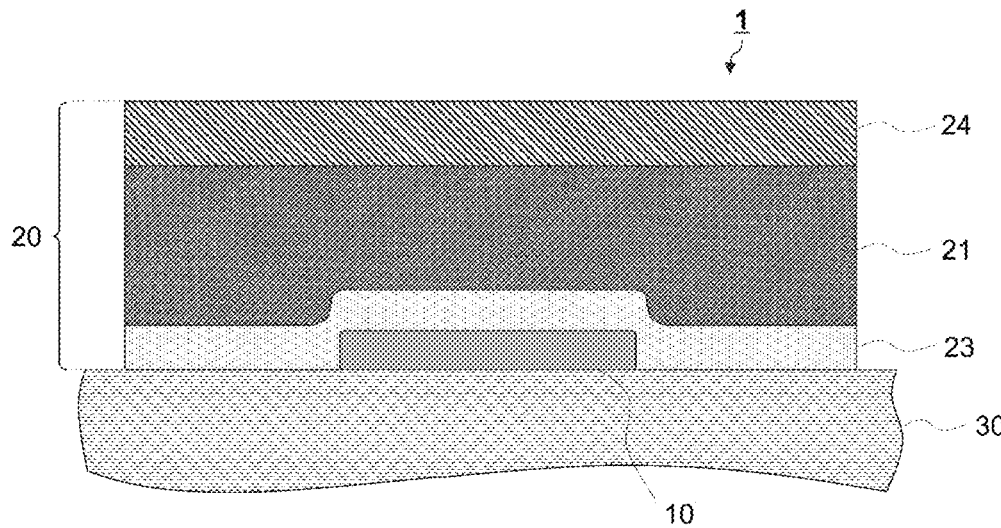
[Fig. 6]
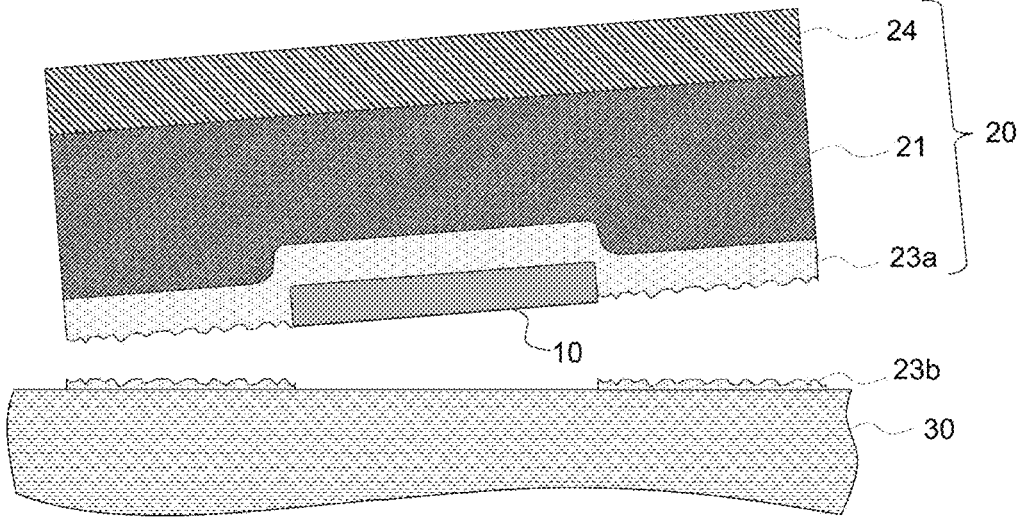

LABELED MOLDED BODY

CLAIM FOR PRIORITY

This application is a Continuation of PCT/JP2024/005474 filed Feb. 16, 2024, and claims the priority benefit of Japanese application 2023-145562 filed Sep. 7, 2023, the contents of which are expressly incorporated by reference herein in their entireties.

TECHNICAL FIELD

The present invention relates to a labeled molded body.

BACKGROUND ART

Non-contact IC tags such as RFID (radio frequency identification) tags have heretofore been utilized in various fields including transport, distribution, sales management, process management in factories, inventory management, commodity delivery, and handling of baggage. For example, Patent Literature 1 has proposed a method of embedding RFID in a side part in a synthetic resin container. Patent Literature 2 has proposed a method of disposing an RFID inlay provided with a thermoplastic adhesive in a mold with the adhesive exposed, and subsequently supplying a heated container material into the mold. Patent Literature 2 has proposed, based on this method, a method for producing a container with an RFID inlay bonded to an outer surface of the container.

Patent Literature 3 has proposed an in-mold label having an antenna and an IC chip in an inner layer, and a labeled thermoplastic resin container formed using the same. The in-mold label of Patent Literature 3 achieves the protection of an IC module in a production process or the like by encapsulating and fixing the IC module between at least two thermoplastic resin films.

CITATION LIST

Patent Literature

[Patent Literature 1] Japanese Patent Laid-Open No. 2021-31104
[Patent Literature 2] Japanese Patent Laid-Open No. 2023-46872
[Patent Literature 3] Japanese Patent Laid-Open No. 2006-48016

SUMMARY OF INVENTION

Problems to be Solved by the Invention

In these days, it is required for reducing environmental load that resin containers used in various products should be recycled as fresh resources after use. However, in the case of containers described in Patent Literatures 1 and 2, an RFID member (e.g., an RFID inlay or an RFID circuit) is embedded in the container itself or firmly bonded to the container. Hence, such a container is usable for various purposes, whereas the container is not easy to recycle by removing the RFID member after use. An in-mold label described in Patent Literature 3 requires holding an antenna and an IC chip between two thermoplastic resin films. It is therefore expected that a simpler production process is provided.

Means for Solving the Problems

The present inventors have conducted diligent studies to solve the problems described above, and consequently found the present invention which relates to a labeled molded body having an RFID member (e.g., an RFID inlay) between a label and a molded body, and having adhesive strength between the molded body and the RFID member and adhesive strength between the molded body and the label equal to or less than predetermined values. According to the present invention, sufficient adhesive strength is present between the label and the molded body at the time of use of the molded body, and the RFID member can be easily removed together with the label from the molded body during the recycling process.

Specifically, the present invention is as follows.

[1] A labeled molded body comprising
a molded body, and
a label disposed on a surface of the molded body, and
further having an RFID member disposed between the molded body and the label, wherein
the molded body comprises a thermoplastic resin at least in a surface layer,
the label has a substrate layer comprising a thermoplastic resin,
adhesive strength between the molded body and the RFID member ($P_{molded\ body\text{-}member}$) is 100 gf/15 mm or less and is equal to or less than adhesive strength between the RFID member and the label ($P_{member\text{-}label}$), and adhesive strength between the molded body and the label ($P_{molded\ body\text{-}label}$) is 90 to 300 gf/15 mm.

[2] The labeled molded body according to [1], wherein the label has a heat sealing layer, and the label and the molded body are thermally fused through the heat sealing layer.

[3] The labeled molded body according to [1] or [2], wherein the label has a coating layer on an outermost surface on the molded body side.

[4] The labeled molded body according to any of [1] to [3], wherein the RFID member is bonded to the label directly or via an additional layer.

[5] The labeled molded body according to any of [1] to [4], wherein the adhesive strength between the molded body and the RFID member ($P_{molded\ body\text{-}member}$) is smaller than the adhesive strength between the RFID member and the label ($P_{member\text{-}label}$).

[6] The labeled molded body according to any of [1] to [5], wherein both of the adhesive strength between the RFID member and the molded body ($P_{molded\ body\text{-}member}$), and the adhesive strength between the RFID member and the label ($P_{member\text{-}label}$) are 50 gf/15 mm or less.

[7] The labeled molded body according to any of [2] to [6], wherein the heat sealing layer is a porous layer.

[8] A label having the RFID member for use in producing the labeled molded body according to any of [1] to [7].

[9] The labeled molded body according to any of [1] to [8], wherein
the RFID member is an RFID inlay, and
adhesive strength between the molded body and the RFID inlay ($P_{molded\ body\text{-}inlay}$) is 100 gf/15 mm or less and is equal to or less than adhesive strength between the RFID inlay and the label ($P_{inlay\text{-}label}$).

[10] The labeled molded body according to any of [1] to [8], wherein
the RFID member is an RFID circuit, and
adhesive strength between the molded body and the RFID circuit ($P_{molded\ body\text{-}circuit}$) is 100 gf/15 mm or less and is equal to or less than adhesive strength between the RFID circuit and the label ($P_{circuit\text{-}label}$).

Advantageous Effects of Invention

The present invention can provide a labeled molded body which achieves high recyclability while requiring no complicated production process. The labeled molded body of the present invention has an RFID member (e.g., an RFID inlay or an RFID circuit) disposed between a molded body and a label and as such, is available as a non-contact IC tag in commodity management, logistics, etc.

BRIEF DESCRIPTION OF DRAWINGS

FIG. 1 is a cross-sectional view showing one example of a labeled molded body according to the first aspect.

FIG. 2 is a cross-sectional view showing one example of a label of FIG. 1 peeled from a molded body.

FIG. 3 is a cross-sectional view showing one example of a labeled molded body according to the second aspect.

FIG. 4 is a cross-sectional view showing one example of a label of FIG. 3 peeled from a molded body.

FIG. 5 is a cross-sectional view showing one example of a labeled molded body according to the third aspect.

FIG. 6 is a cross-sectional view showing one example of a label of FIG. 5 peeled from a molded body.

MODE FOR CARRYING OUT THE INVENTION

Hereinafter, the labeled molded body of the present invention will be described. The following description illustrates one embodiment (representative example) of the present invention, and the present invention is not limited thereby.

In the following description, the term "(meth)acryl" refers to both acryl and methacryl.

The labeled molded body of the present embodiment is a labeled molded body comprising a molded body and a label disposed on a surface of the molded body, and further having an RFID member disposed between the molded body and the label, wherein adhesive strength between the molded body and the RFID member ($P_{molded\ body-member}$) is 100 gf/15 mm or less and is equal to or less than adhesive strength between the RFID member and the label ($P_{member-label}$), and adhesive strength between the molded body and the label ($P_{molded\ body-label}$) is 90 to 300 gf/15 mm.

In this context, the RFID member may be, for example, an RFID inlay having a support as described below in detail, or may be an RFID circuit or the like having no support. When the RFID member is an RFID inlay, the adhesive strength between the molded body or the label and the RFID inlay is preferably as follows.

In the labeled molded body, the adhesive strength between the molded body and the RFID inlay ($P_{molded\ body-inlay}$) is 100 gf/15 mm or less and is equal to or less than the adhesive strength between the RFID inlay and the label ($P_{inlay-label}$), and the adhesive strength between the molded body and the label ($P_{molded\ body-label}$) is 90 to 300 gf/15 mm.

When the RFID member is an RFID circuit, the adhesive strength between the molded body or the label and the RFID circuit is preferably as follows.

In the labeled molded body, the adhesive strength between the molded body and the RFID circuit ($P_{molded\ body-circuit}$) is 100 gf/15 mm or less and is equal to or less than the adhesive strength between the RFID circuit and the label ($P_{circuit-label}$), and the adhesive strength between the molded body and the label ($P_{molded\ body-label}$) is 90 to 300 gf/15 mm.

Examples of the labeled molded body include a labeled molded body 1 as shown in FIG. 1 in which a label 20 is disposed on a surface of a molded body 30. The labeled molded body 1 has an RFID member 10 between the molded body 30 and the label 20. The size of the label 20 relative to the size of the RFID member 10 is not limited. The entire surface of the RFID member 10 is preferably covered with the label 20.

In the labeled molded body of the present embodiment, the adhesive strength between the molded body and the RFID member ($P_{molded\ body-member}$) is 100 gf/15 mm or less, whereby the RFID member is easily removed from the molded body in a recycling process after use of the molded body. Smaller adhesive strength between the molded body and the RFID member ($P_{molded\ body-member}$) is more suitable for recycling. Therefore, the adhesive strength is preferably 90 gf/15 mm or less, particularly preferably 50 gf/15 mm or less, i.e., the molded body and the RFID member are substantially not bonded to each other.

When the RFID member is an RFID inlay, the adhesive strength between the molded body and the RFID inlay ($P_{molded\ body-inlay}$) is 100 gf/15 mm or less, whereby the RFID inlay is easily removed from the molded body in a recycling process after use of the molded body. Smaller adhesive strength between the molded body and the RFID inlay ($P_{molded\ body-inlay}$) is more suitable for recycling. Therefore, the adhesive strength is preferably 90 gf/15 mm or less, particularly preferably 50 gf/15 mm or less, i.e., the molded body and the RFID inlay are substantially not bonded to each other.

Likewise, when the RFID member is an RFID circuit, the adhesive strength between the molded body and the RFID circuit ($P_{molded\ body-circuit}$) is 100 gf/15 mm or less, whereby the RFID circuit is easily removed from the molded body in a recycling process after use of the molded body. Smaller adhesive strength between the molded body and the RFID circuit ($P_{molded\ body-circuit}$) is more suitable for recycling. Therefore, the adhesive strength is preferably 90 gf/15 mm or less, particularly preferably 50 gf/15 mm or less, i.e., the molded body and the RFID circuit are substantially not bonded to each other.

In this context, the phrase "substantially" not bonded" refers to a state in which the adhesive strength is 50 gf/15 mm or less, and refers to, for example, the case where the adhesive strength is impossible to evaluate when the following evaluation test is conducted.

In this context, the adhesive strength can be measured in accordance with JIS K6854-3: 1999 by cutting a label-attached portion of the molded body into a 15 mm wide strip, and peeling the strip in a T shape at tensile strength of 300 mm/min using a tensile tester. If the label-attached portion of the molded body is not cut at a width of 15 mm, the adhesive strength may be measured as to only a cut portion and converted to a value obtained with the width defined as 15 mm.

In the labeled molded body of the present embodiment, the adhesive strength between the molded body and the RFID member ($P_{molded\ body-member}$) is equal to or less than the adhesive strength between the RFID member and the label ($P_{member-label}$) (($P_{molded\ body-member}$)$\leq$($P_{member-label}$)). However, when both of the adhesive strength between the molded body and the RFID member ($P_{molded\ body-member}$) and the adhesive strength between the RFID member and the label ($P_{member-label}$) are 50 gf/15 mm or less, i.e., both the components are substantially not bonded to each other, ($P_{molded\ body-member}$)=($P_{member-label}$), i.e., equivalent adhesive strength, can hold. More specifically, when the adhesive strength between the molded body and the RFID member ($P_{molded\ body-member}$) is 50 gf/15 mm or less, i.e., both the components are substantially not bonded to each other, the adhesive strength between the RFID member and the label ($P_{member-label}$) is 50 gf/15 mm or less, i.e., both the components are substantially not bonded to each other either; or, if the components are bonded to each other, the adhesive strength therebetween is arbitrary. When the adhesive strength between the molded body and the RFID member ($P_{molded\ body-member}$) is larger than 50 gf/15 mm, i.e., both the components are bonded to each other, the adhesive strength between the RFID member and the label ($P_{member-label}$) is preferably larger than the adhesive strength between the molded body and the RFID member ($P_{molded\ body-member}$) (($P_{member-label}$)>($P_{molded\ body-member}$)). When the adhesive strength between the molded body and the RFID member and the adhesive strength between the RFID member and the label are respectively in such relationships, the RFID member is removed together with the label bonded to the RFID member or peeled even from the label and separated and removed alone, in peeling the label from the molded body in a recycling process. Hence, the RFID member is easily separated from the molded body or the label, and the molded body or the label is easily recovered in a recycling process.

Thus, for the molded body-RFID member adhesive strength and the RFID member-label adhesive strength, it is preferred that the adhesive strength between the RFID member and the label ($P_{member-label}$) should be larger than the adhesive strength between the molded body and the RFID member ($P_{molded\ body-member}$) (i.e., the adhesive strength between the molded body and the RFID member should be smaller than the adhesive strength between the label and the RFID member), or the RFID member should be substantially bonded to neither the molded body nor the label (i.e., the adhesive strength should be 50 gf/15 mm or less in both cases). The adhesive strength between the molded body and the RFID member ($P_{molded\ body-member}$) is more preferably smaller than the adhesive strength between the label and the RFID member ($P_{member-label}$) (($P_{molded\ body-member}$)<($P_{member-label}$)) because this is advantageous for a molding process for the molded body.

In the labeled molded body of another embodiment, the adhesive strength between the molded body and the RFID inlay ($P_{molded\ body-inlay}$) is equal to or less than the adhesive strength between the RFID inlay and the label ($P_{inlay-label}$) (($P_{molded\ body-inlay}$)≤($P_{inlay-label}$)). However, when both of the adhesive strength between the molded body and the RFID inlay ($P_{molded\ body-inlay}$) and the adhesive strength between the RFID inlay and the label ($P_{inlay-label}$) are 50 gf/15 mm or less, i.e., both the components are substantially not bonded to each other, ($P_{molded\ body-inlay}$)=($P_{inlay-label}$), i.e., equivalent adhesive strength, can hold. More specifically, when the adhesive strength between the molded body and the RFID inlay ($P_{molded\ body-inlay}$) is 50 gf/15 mm or less, i.e., both the components are substantially not bonded to each other, the adhesive strength between the RFID inlay and the label ($P_{inlay-label}$) is 50 gf/15 mm or less, i.e., both the components are substantially not bonded to each other either; or, if the components are bonded to each other, the adhesive strength therebetween is arbitrary. When the adhesive strength between the molded body and the RFID inlay ($P_{molded\ body-inlay}$) is larger than 50 gf/15 mm, i.e., both the components are bonded to each other, the adhesive strength between the RFID inlay and the label ($P_{inlay-label}$) is preferably larger than the adhesive strength between the molded body and the RFID inlay ($P_{molded\ body-inlay}$) (($P_{inlay-label}$)>($P_{molded\ body-inlay}$)). When the adhesive strength between the molded body and the RFID inlay and the adhesive strength between the RFID inlay and the label are respectively in such relationships, the RFID inlay is removed together with the label bonded to the RFID inlay or peeled even from the label and separated and removed alone, in peeling the label from the molded body in a recycling process. Hence, the RFID inlay is easily separated from the molded body or the label, and the molded body or the label is easily recovered in a recycling process.

Thus, for the molded body-RFID inlay adhesive strength and the RFID inlay-label adhesive strength, it is preferred that the adhesive strength between the RFID inlay and the label ($P_{inlay-label}$) should be larger than the adhesive strength between the molded body and the RFID inlay ($P_{molded\ body-inlay}$) (i.e., the adhesive strength between the molded body and the RFID inlay should be smaller than the adhesive strength between the label and the RFID inlay), or the RFID inlay should be substantially bonded to neither the molded body nor the label (i.e., the adhesive strength should be 50 gf/15 mm or less in both cases). The adhesive strength between the molded body and the RFID inlay ($P_{molded\ body-inlay}$) is more preferably smaller than the adhesive strength between the label and the RFID inlay ($P_{inlay-label}$) (($P_{molded\ body-inlay}$)<($P_{inlay-label}$)) because this is advantageous for a molding process for the molded body.

The adhesive strength between the molded body and the label ($P_{molded\ body-label}$) is 90 to 300 gf/15 mm. The adhesive strength between the molded body and the label ($P_{molded\ body-label}$) is equal to or less than the upper limit value, whereby the label is easily peeled from the molded body in a recycling process, and as a result, the RFID member (e.g., an RFID inlay or an RFID circuit) is removed from the molded body. The adhesive strength is equal to or more than the lower limit value, whereby the label is not detached from the molded body at the time of use of the molded body so that the molded body can be used for various purposes without problems.

The adhesive strength between the molded body and the label ($P_{molded\ body-label}$) is preferably 270 gf/15 mm or less, more preferably 200 gf/15 mm or less, and preferably 100 gf/15 mm or more, more preferably 130 gf/15 mm or more.

[Rfid Member]

The RFID member that can be used in the present embodiment is not particularly limited by its type and can have, for example, an RFID antenna and IC chip connected to the RFID antenna. A method for forming the antenna in the RFID member is not particularly limited. The RFID antenna may be formed directly on the label without a support, or an RFID inlay formed on a support may be attached to the label. The RFID antenna can be formed, for example, by etching a metal portion of a film with a metal foil, or printing a conductive paste or the like. In the case of attaching an RFID inlay to the label, the RFID inlay is disposed as the RFID member between the molded body and the label. For example, in the case of forming an RFID antenna directly on the label, the RFID member is disposed as an RFID circuit between the molded body and the label.

[RFID Inlay]

A preferred form of the RFID member includes, for example, an RFID inlay with an antenna formed on a support. An RFID inlay having a known configuration can be applied thereto, and the RFID inlay is not particularly limited. Specifically, the RFID inlay can have an RFID antenna attached to a support, and an IC chip connected to the RFID antenna. The RFID inlay performs reading of information from the IC chip and writing of information to the IC chip through reader/writer non-contact communication. When the RFID inlay is bonded to the label, a thermoplastic resin adhesive layer may be disposed directly on an antenna- and IC chip-mounted surface of the support of the RFID inlay and the RFID inlay can be bonded to the label via the adhesive layer. In the RFID inlay used in the present embodiment, a surface having the RFID antenna and the IC chip may be encapsulated in a resin. In the case of encapsulation, the RFID inlay may be bonded to the label directly, i.e., via only the encapsulating resin, or may have an adhesive layer aside from the encapsulating resin and be bonded to the label via this layer.

When a resin contained in an outermost layer of the molded body is a non-polar resin such as polypropylene or polyethylene, the support or the encapsulating resin of the RFID inlay is preferably a polar resin such as a polyester-based resin (e.g., polyethylene terephthalate), a polyamide-based resin, or a polyimide-based resin. This easily satisfies the adhesive strength relationships of the present invention mentioned above and is thus preferred, because of low adhesiveness of the molded body to the polar resin. The support may be ceramic.

[RFID Circuit]

A preferred form of the RFID member includes, for example, an RFID circuit having no support. Specifically, the RFID circuit can have an RFID antenna and an IC chip connected to the RFID antenna, and has no support. The antenna of the RFID member can be formed on the label using, for example, a conductive paste. The conductive paste comprises conductive particles, a binder, and the like, and can impart conductivity to subjects joined by the curing of the resin. Examples of the conductive particles include silver, copper, nickel, gold, and carbon. Examples of the binder include epoxy-based resins, phenol-based resins, acrylic resins, urethane-based resins, and silicone-based resins. The IC chip is further connected onto the RFID antenna through an anisotropically conductive adhesive or the like. The RFID circuit also performs reading of information from the IC chip and writing of information to the IC chip through reader/writer non-contact communication. When the RFID circuit is bonded to the label, a thermoplastic resin adhesive layer may be disposed directly on an antenna- and IC chip-mounted surface of the RFID circuit and the RFID circuit can be bonded to the label via the adhesive layer.

When a resin contained in an outermost layer of the molded body is a non-polar resin such as polypropylene or polyethylene, the binder constituting the RFID antenna can be any of various resins listed above. This easily satisfies the adhesive strength relationships of the present invention mentioned above because of low adhesiveness to the non-polar resin.

[Substrate Layer]

The substrate layer comprises a thermoplastic resin. Examples of the thermoplastic resin contained in the substrate layer include olefin-type resins, ester-based resins, amide-based resins, polyvinyl chloride resins, polystyrene resins, and polycarbonate resins. The substrate layer preferably comprises an olefin-type resin or an ester-based resin, more preferably an olefin-type resin, as the thermoplastic resin from the viewpoint of mechanical strength. Two or more thermoplastic resins may be mixed and used for the substrate layer.

Examples of the olefin-type resin include propylene-based resins and ethylene-based resins. A propylene-based resin is preferred from the viewpoint of moldability and mechanical strength.

The propylene-based resin is not particularly limited as long as propylene is used as a main monomer. Examples thereof include isotactic polymers and syndiotactic polymers obtained by the homopolymerization of propylene. Alternatively, a propylene-α-olefin copolymer may be used which is a copolymer of the main component propylene and α-olefin such as ethylene, 1-butene, 1-pentene, 4-methyl-1-pentene, 1-hexene, 1-heptene, or 1-octene. In this context, the "main component" refers to a monomer that occupies 50% by mass or more among monomers constituting a copolymer. The copolymer may have binary monomer components or multinary (e.g., ternary or higher) monomer components, and may be a random copolymer or a block copolymer. A propylene homopolymer and a propylene copolymer may be used in combination. Among them, a propylene homopolymer is easily handled as a main starting material for the substrate layer and is thus preferred.

Examples of the ethylene-based resin include high-density polyethylene having a density of 0.940 to 0.965 g/cm$^3$, medium-density polyethylene having a density of 0.920 to 0.934 g/cm$^3$, linear low-density polyethylene having a density of 0.900 to 0.920 g/cm$^3$, copolymers composed mainly of ethylene or the like copolymerized with α-olefin such as propylene, butene, hexene, heptene, octene, or 4-methyl-1-pentene, ethylene-(meth)acrylic acid alkyl ester copolymers, ethylene-(meth)acrylic acid copolymers and metal salts thereof (examples of the metal include zinc, aluminum, lithium, sodium, and potassium), and ethylene-cyclic olefin copolymers.

Examples of the ester-based resin include polyethylene terephthalate, polybutylene terephthalate, and polyethylene naphthalate.

Examples of the amide-based resin include nylon-6, nylon-6,6, nylon-6,10, and nylon-6,12.

The content of the thermoplastic resin in the substrate layer is preferably 50% by mass or more, more preferably 70% by mass or more. When the content is 50% by mass or more, the mechanical strength of the substrate layer is easily improved. On the other hand, there is no particular upper limit on the content of the thermoplastic resin. The content may be 100% by mass or may be less than 100% by mass by the addition of a filler and an additive, etc. mentioned later without influencing strength or moldability.

<Filler>

The substrate layer can contain a filler. The filler contained therein facilitates forming pores with the filler as a core in the inside and can enhance whiteness or opacity.

Examples of the filler that can be used in the substrate layer include inorganic fillers and organic fillers. Each of various fillers may be used singly, or two or more thereof may be used in combination.

Examples of the inorganic filler include inorganic particles such as heavy calcium carbonate, light calcium carbonate, baked clay, silica, diatomaceous earth, white earth, talc, titanium oxide such as rutile titanium dioxide, barium sulfate, aluminum sulfate, zinc oxide, magnesium oxide, mica, sericite, bentonite, sepiolite, vermiculite, dolomite, wollastonite, and glass fiber. Among them, heavy calcium carbonate, clay, or diatomaceous earth is preferred because of favorable pore moldability and inexpensiveness. The inorganic filler may be surface-treated with a surface treatment agent such as a fatty acid for the purpose of improving dispersibility, for example.

Examples of the organic filler include organic fillers made of a resin incompatible with the thermoplastic resin contained in the substrate layer. When the thermoplastic resin is, for example, an olefin-type resin, examples thereof include organic particles incompatible therewith, such as polyethylene terephthalate, polyethylene naphthalate, polybutylene terephthalate, polyamide, polycarbonate, polystyrene, cyclic olefin homopolymers, ethylene-cyclic olefin copolymers, polyethylene sulfide, polyimide, polymethacrylate, polyether ether ketone, polyphenylene sulfide, and melamine resins.

One of these inorganic fillers or organic fillers can be used singly, or two or more thereof can be used in combination.

The content of the filler in the substrate layer is preferably 10% by mass or more, more preferably 15% by mass or more, from the viewpoint of enhancing the whiteness or opacity of the substrate layer. The content of the filler in the substrate layer is preferably 70% by mass or less, more preferably 60% by mass or less, further preferably 50% by mass or less, from the viewpoint of enhancing the uniform molding of the substrate layer. On the other hand, the content of the filler in the substrate layer may be less than 10% by mass and may be 0% by mass, from the viewpoint of enhancing the transparency of the substrate layer.

The average particle size of the inorganic filler or the organic filler is preferably 0.01 μm or larger, more preferably 0.05 μm or larger, further preferably 0.1 μm or larger, from the viewpoint of easy pore formation. The average particle size of the inorganic filler or the organic filler is preferably 15 μm or smaller, more preferably 5 μm or smaller, further preferably 2 μm or smaller, from the viewpoint of conferring mechanical strength such as tear resistance.

The average particle size of the inorganic filler is volume-average particle size (cumulative 50% particle size) $D_{50}$ which corresponds to a cumulative volume of 50% measured with a particle measuring device, for example, a laser diffraction particle size distribution measuring device (Microtrac, manufactured by Nikkiso Co., Ltd.). The average particle size of the organic filler is an average dispersed particle size of particles dispersed in the thermoplastic resin by melt kneading and dispersion. The average dispersed particle size can be determined by observing a cut surface of a thermoplastic resin film containing the organic filler under an electron microscope, measuring the largest diameters of at least ten particles, and determining an average value thereof. The average particle size is the volume-average particle size in any case.

<Porosity>

When the substrate layer has pores in the inside, the porosity, which represents the ratio of the pores in the layer, is preferably 10% or more, more preferably 20% or more, further preferably 30% or more, from the viewpoint of obtaining opacity. The porosity is preferably 70% or less, more preferably 55% or less, further preferably 40% or less, from the viewpoint of maintaining mechanical strength. On the other hand, the porosity may be less than 10% and may be 0%, from the viewpoint of enhancing the transparency of the substrate layer.

A smaller specific gravity of the label is preferred, and a higher porosity of the substrate layer is preferred, because of easy specific gravity separation from the molded body in a recycling process.

The porosity can be determined from the ratio of an area occupied by the pores in a given region at a cross section of a sample observed under an electron microscope.

A larger content of the filler usually increases the porosity, enhances the whiteness or opacity of the substrate layer, and decreases the specific gravity. The content or porosity of the filler can be selected depending on transparency, whiteness, or a specific gravity, etc. required for a laminate.

<Other Additives>

The substrate layer can contain a component including: an antioxidant such as a sterically hindered phenol, phosphorus, amine, or sulfur antioxidant; a light stabilizer such as a sterically hindered amine, benzotriazole, or benzophenone light stabilizer; a dispersant; or an antistatic, depending on necessary physical properties. When the substrate layer contains these components, the content of each component is preferably 0.001 to 1% by mass based on the total mass of the individual components constituting the substrate layer.

The thickness of the substrate layer is preferably 20 μm or larger, more preferably 40 μm or larger, from the viewpoint of layer strength. The thickness of the substrate layer is preferably 200 μm or smaller, more preferably 150 μm or smaller, from the viewpoint of the weight reduction of the label. The substrate layer may have a single-layer structure or may have a multilayer structure. The substrate layer is preferably in a sheet form and may be non-stretched or may be stretched.

[Label]

The material and configuration of the label are not particularly limited as long as the label has the substrate layer and has the adhesive strength mentioned above against the molded body. Such a label exhibits favorable releasability in a recycling process. The label may have, for example, a heat sealing layer on a molded body-side surface of the substrate layer. Also, a coating layer having a function of adjusting the adhesive force of the label may be disposed as an outermost surface layer on the molded body side of the label.

More specifically, for example, the first aspect includes a label 20 having a coating layer 22 on a surface on the molded body 30 side of a substrate layer 21, as shown in FIG. 1. The second aspect includes, a label having a substrate layer 21 and a heat sealing layer 23 and having a coating layer 22 on a surface on the molded body 30 side of the heat sealing layer 23, as shown in FIG. 3. Both the aspects have the coating layer 22 as an outermost surface layer (outermost layer) on the molded body 30 side of the label.

The third aspect includes a label 20 having a substrate layer 21 and a brittle heat sealing layer 23, as shown in FIG. 5. In the second and third aspects, the label 20 and the molded body 30 are thermally fused through the heat sealing layer 23.

In the first and second aspects, the label 20 is peeled at an interface with the molded body 30 (FIGS. 2 and 4). In the third aspect, the label 20 is peeled by the cohesive failure of the brittle heat sealing layer 23 (FIG. 6).

Hereinafter, these aspects will be described in order.

<First Aspect: Label Having Coating Layer on Substrate Layer Surface>

The first aspect is an example in which the label lacks the heat sealing layer mentioned later. In this example, the label is bonded to the molded body by in-mold molding based on injection molding or the like (FIG. 1). For example, when both of the surface layer (outermost layer) of the molded body and the substrate layer of the label are layers containing polyolefin as a main component, the label can be attached by in-mold molding without disposing the heat sealing layer in the label as long as the molding method has a relatively high molding temperature and a high resin pressure at the time of molding, as in injection molding. In this context, the "main component" refers to a resin that occupies 50% by mass or more among thermoplastic resins contained in the layer. For adjusting the adhesive strength between the label and the molded body to the desired range, it is preferred to dispose a coating layer on a molded body-side surface of the label.

When the label 20 having the coating layer 22 is peeled from the molded body 30, as shown in FIG. 2, the label 20 is peeled at an interface with the molded body 30.

The coating layer can have an effect of adjusting the adhesive strength between the molded body and the label ($P_{molded\ body\text{-}label}$) to the desired value, and is not limited by its material as long as such an effect is exerted. For example, when the outermost layer of the molded body is a layer containing a non-polar resin polyolefin as a main component, the coating layer is preferably a layer containing a polar resin having no heat sealability (hereinafter, also simply referred to as a "polar resin"). In this context, the phrase "having no heat sealability" refers to, for example, a resin that is not melted under heat, a resin having a glass transition temperature of 100° C. or higher, or a resin having no melting point. The polar resin contained in the coating layer is effective for suppressing the thermal fusion of the molded body to the substrate layer, and adjusting the adhesive strength between the molded body and the label ($P_{molded\ body\text{-}label}$) to the desired value. When both of the outermost layer of the molded body and the outermost surface layer on the molded body side of the substrate layer are made of a non-polar resin, the coating layer containing the polar resin exerts a particularly marked effect of adjusting the adhesive strength between the molded body and the label ($P_{molded\ body\text{-}label}$)

Examples of the polar resin having no heat sealability include ethyleneimine-based resins, and cationic polymer antioxidants having an ammonium salt structure, a phosphonium salt structure, or the like.

Examples of the ethyleneimine-based resin include polyethyleneimine, poly(ethyleneimine-urea), ethyleneimine adducts of polyamine polyamide, their alkyl-modified forms, cycloalkyl-modified forms, aryl-modified forms, allyl-modified forms, aralkyl-modified forms, benzyl-modified forms, cyclopentyl-modified forms, cyclic aliphatic hydrocarbon-modified forms, and glycidol-modified forms, and their hydroxides.

The cationic polymer antistatic is further preferably an antistatic having an ammonium salt structure, particularly preferably an acrylic resin having a tertiary or quaternary ammonium salt structure, most preferably an acrylic resin having a quaternary ammonium salt structure.

The thickness of the coating layer containing the polar resin is preferably 0.01 μm or larger, more preferably 0.02 μm or larger, further preferably 0.03 μm or larger, for moderately reducing the adhesiveness between the outermost layer of the molded body and the substrate layer. The thickness is preferably 1.5 μm or smaller, more preferably 1.0 μm or smaller, further preferably 0.5 μm or smaller.

The coating layer containing the polar resin can be formed, for example, by applying an aqueous solution or a solution containing the polar resin to a substrate surface, followed by drying. The substrate surface on which the coating layer is to be formed is preferably in a state activated by corona discharge treatment so that the adhesion and wettability of the coating layer are improved.

A peeling varnish layer may be used as the coating layer. Examples of the peeling varnish include varnishes supplemented with a silicone resin, and varnishes supplemented with a fluorine compound. The peeling varnish layer is preferably disposed at an area ratio on the order of 40 to 80% to a substrate layer surface. The area ratio of the coating layer can be selected from the range described above depending on the degree of adhesive force between the outermost layer of the molded body and the substrate layer, and masking may be performed, if necessary, at the time of coating. The thickness of the peeling varnish layer is preferably 0.1 μm or larger, more preferably 0.5 μm or larger, for moderately reducing the adhesiveness between the outermost layer of the molded body and the substrate layer. The thickness is preferably 10 μm or smaller, more preferably 5 μm or smaller. The coating layer can have an effect of adjusting the adhesive strength between the molded body and the label ($P_{molded\ body\text{-}label}$) to the desired value, and may have variations in layer thickness or may be disposed in an irregular shape such as a dot shape.

<Second Aspect: Having Substrate Layer and Heat Sealing Layer and Having Coating Layer on Molded Body-Side Surface of Heat Sealing Layer>

In a labeled molded body obtained by use of a molding method, for example, blow molding, having a molding temperature that is not much high and a resin pressure that is not high at the time of molding, the label preferably has a heat sealing layer. Examples of the heat sealing layer include known ones. The heat sealing layer preferably contains a thermoplastic resin having a low melting point on the order of 60 to 130° C.

Examples of the thermoplastic resin for use in the heat sealing layer preferably include polyethylene-based resins having a melting point of 60 to 130° C., such as low-density or medium-density polyethylene having a density of 0.900 to 0.935 g/cm$^3$, linear polyethylene having a density of 0.880 to 0.940 g/cm$^3$, ethylene-vinyl acetate copolymers, ethylene-acrylic acid copolymers, ethylene-acrylic acid alkyl ester copolymers, ethylene-methacrylic acid alkyl ester copolymers having an alkyl group having 1 to 8 carbon atoms, and metal (e.g., Zn, Al, Li, K, and Na) salts of ethylene-methacrylic acid copolymers. Among them, low-density or medium-density polyethylene having a degree of crystallinity of 10 to 60% measured by an X ray method and a number-average molecular weight of 10,000 to 40,000, or linear low-density polyethylene is preferred.

The heat sealing layer may have a single-layer structure or may have a multilayer structure. The thickness (total thickness in the case of a multilayer structure) of the heat sealing layer is preferably 0.5 μm or larger, more preferably 0.7 μm or larger, further preferably 1 μm or larger, from the viewpoint of enhancing adhesiveness. On the other hand, the thickness is preferably 10 μm or smaller, more preferably 7 μm or smaller, further preferably 6 μm or smaller, from the viewpoint of suppressing cohesive failure inside the heat sealing layer. Thus, the thickness of the heat sealing layer is preferably 0.5 to 10 μm, more preferably 0.7 to 7 μm, further preferably 1 to 6 μm.

For adjusting the adhesive strength between the heat sealing layer and the molded body to the desired range, it is preferred to dispose a coating layer on a molded body-side surface of the heat sealing layer. Examples of the coating layer include the same layers as those listed in the section of the first aspect. Preferred examples thereof are also the same as in the section of the first aspect.

<Third Aspect: Label Having Substrate Layer and Brittle Heat Sealing Layer>

In this aspect, the label has a brittle heat sealing layer having low strength. In a labeled molded body having the label of this aspect, the label can be peeled from the molded body by the cohesive failure of the label itself. Examples of the brittle heat sealing layer include heat sealing layers which are porous resin layers having an open surface. Since a thermoplastic resin composition serving as a melted molded body material enters the opening part of the heat sealing layer surface, the layer is firmly bonded to a molded body surface through an anchor effect. Nonetheless, the heat sealing layer itself is brittle and has low strength and can therefore be easily detached from the molded article by the cohesive failure of the layer. In this respect, the heat sealing layer 23 is peeled such that, as shown in FIG. 6, a part 23*a* of the heat sealing layer is peeled together with the label 20 while another part 23*b* of the heat sealing layer remains in the molded body.

The heat sealing layer which is a porous resin layer having an open surface (hereinafter, also simply referred to as a "porous heat sealing layer") is preferably prepared by stretching a resin composition containing a thermoplastic resin and a filler. For more smooth cohesive failure, it is preferred to blend at least two resins incompatible with each other as the thermoplastic resin and stretch the resulting composition in a phase-separated state. Peeling occurs not only at the interface between the resin and the filler but at the interface between these resins. Thus, the heat sealing layer becomes capable of being peeled in a uniform surface pattern.

Examples of the thermoplastic resin can include blends of a crystalline polypropylene resin and a thermoplastic resin incompatible with the crystalline polypropylene resin. The degree of crystallinity of the crystalline polypropylene resin is usually 65% or more, preferably 66% or more, particularly preferably 67 to 80%. When the degree of crystallinity is 65% or more, mutual dissolution of an amorphous moiety contained in the crystalline polypropylene resin, and the incompatible thermoplastic resin is unlikely to proceed. Thus, an effect of initial interfacial peeling is easily obtained, and stress (adhesive strength) required for peeling can be moderately decreased. When the degree of crystallinity is 80% or less, such a resin is easily commercially available. The degree of crystallinity can be determined by a method described in, for example, International Publication No. WO 2012/002510.

Examples of the thermoplastic resin incompatible with the crystalline polypropylene resin include polyethylene resins, styrene-based resins, cyclic polyolefin resins, ethylene-cyclic olefin copolymer resins, polyamide-based resins such as nylon-6, nylon-6,6, nylon-6,10, and nylon-6,12, polyethylene terephthalate and copolymers thereof, polyethylene naphthalate, polybutylene terephthalate, polybutylene succinate, polylactic acid, thermoplastic polyester-based resins such as aliphatic polyester, and polycarbonate. These resins may be used as a mixture of two or more thereof. Among them, a polyethylene resin is preferably used from the viewpoint of chemical resistance, production cost, etc.

In the present invention, the term "incompatible" means that a blend of the crystalline polypropylene resin and the incompatible thermoplastic resin, when observed under an electron microscope, morphologically has a sea-island structure and the dimension of the structure is 0.3 to 10 μm.

In the blend, the content of the thermoplastic resin incompatible with the crystalline polypropylene resin is usually 105 to 300 parts by mass, preferably 120 to 280 parts by mass, more preferably 140 to 270 parts by mass, per 100 parts by mass of the crystalline polypropylene resin. When the content of the incompatible thermoplastic resin falls within the range described above, cohesive failure in the heat sealing layer proceeds more smoothly.

Examples of the filler contained in the porous heat sealing layer include the same as those listed in the section of the substrate layer. It is particularly preferred to contain an inorganic filler having a hydrophobized surface. Use of the hydrophobized inorganic filler more facilitates causing interfacial peeling between the filler and the crystalline polypropylene resin and enables the label more easily separable from the molded body to be provided.

Examples of the surface treatment agent for use in the hydrophobizing treatment include paraffin and fatty acids having 12 to 22 carbon atoms and salts thereof.

The average particle size of the filler is preferably 0.1 μm or larger, more preferably 0.2 μm or larger, and preferably 5 μm or smaller, more preferably 2 μm or smaller, further preferably 0.5 μm or smaller. A relatively small average particle size is preferred because fine and uniform pores can be formed in the porous heat sealing layer. Light calcium carbonate having a uniform particle size and shape is preferably used.

The porous heat sealing layer contains usually 30 to 60% by mass, preferably 35 to 50% by mass, of the blend of the crystalline polypropylene resin and the thermoplastic resin incompatible with the crystalline polypropylene resin, and contains usually 40 to 70% by mass, preferably 50 to 65% by mass, of the filler. The heat sealing layer is preferably stretched at least in a uniaxial direction. The porous heat sealing layer contains 40% by mass or more of the filler, whereby sufficient releasability is easily obtained. The filler content is 70% by mass or less, whereby the molding stability of the layer is easily obtained.

The porous heat sealing layer can have many continuous pores in the inside as a result of preparing the composition mentioned above and forming the layer therefrom by stretching. Thus, even if air remains between the heat sealing layer and the molded body in attaching the label having the layer to the molded body, this air is pushed out by the resin via the continuous pores and discharged to the outside. This is preferred because air is prevented from remaining therebetween and causing dilation in the label.

The surface opening ratio of the porous heat sealing layer is preferably 7 to 60%, more preferably 12 to 50%, particularly preferably 15 to 40%. When the surface opening ratio is 7% or more, sufficient adhesiveness is easily obtained. When the surface opening ratio is 60% or less, the layer is unlikely to break at the time of stretch-molding of the layer. In this context, the "surface opening ratio" refers to the ratio of an area occupied by pores in an observation region when the molded body-side surface of the heat sealing layer is observed under an electron microscope.

The porosity of the porous heat sealing layer is preferably 20% or more, more preferably 30% or more, particularly preferably 35% or more. On the other hand, the porosity of the porous heat sealing layer is preferably 65% or less, more preferably 55% or less, particularly preferably 50% or less. When the porosity is 20% or more, sufficient adhesiveness tends to be easily obtained. When the porosity is 65% or less, the layer is unlikely to break at the time of stretch-molding of the layer. Furthermore, the adhesive strength between the RFID member and the label $P_{member-label}$ is improved, and the releasability of the RFID member from the label is easily improved.

The surface opening ratio and the porosity can be determined by methods described in International Publication No. WO 2012/002510.

The porous heat sealing layer may optionally contain a dispersant for the filler, and various known additives without impairing the advantageous effects of the present invention. The heat sealing layer may be a single layer or may have a multilayer structure.

[Optional Layer]

In the label, each layer may be a single layer or may be a laminate composed of a plurality of layers. The label may have a printed layer (print receiving layer) on a surface on the side opposite to the heat sealing layer for the substrate layer. In addition, the label may have a layer other than those mentioned above without impairing the advantageous effects of the present invention.

Each layer may be non-stretched or may be stretched. Layers differing in the presence or absence of stretching or the number of stretching axes may be combined, and one or more layers are preferably stretched. The heat sealing layer may have variations in layer thickness and may have a specific embossed shape on a surface by embossing mentioned later, for example.

[Method for Producing Label]

A method for producing the label is not particularly limited. The label can be produced, for example, by forming films of the substrate layer and an arbitrary layer such as a heat sealing layer, and laminating the films.

Examples of the method for forming the film of each layer include film molding methods such as extrusion molding (cast molding) using a T die, inflation molding using a circular die, and calender molding using a roll for rolling.

Examples of the method for laminating the individual films include co-extrusion methods, extrusion lamination methods, and coating methods, which can be combined. The coating layer is preferably formed by a coating method, as mentioned above.

The surface of the heat sealing layer may be embossed. Asperities are formed on the heat sealing layer surface by embossing and can thereby suppress the generation of blister at the time of label attachment to the molded body.

Each layer may be a non-stretched film or may be a stretched film. Each layer may be individually stretched before lamination, or the individual layers may be stretched together after lamination. A non-stretched layer and a stretched layer may be laminated and then re-stretched.

The stretching method can be appropriately selected and adopted from known methods, for example, a MD stretching method exploiting the difference in circumferential velocity of a roll group, a TD stretching method using a tenter oven, and a sequential biaxial stretching method which is a combination of these methods.

[Molded Body]

The molded body can comprise a thermoplastic resin at least in a surface layer and is not particularly limited. For the molded body, it is preferred that not only the surface layer but the whole should be constituted by the thermoplastic resin, because of production advantages. Examples of the thermoplastic resin of the molded body can include polyethylene-based resins, polypropylene-based resins, polyester-based resins, polystyrene-based resins, polyvinyl chloride-based resins, and polycarbonate-based resins. Among them, high-density polyethylene, polypropylene, an ethylene-propylene copolymer, polyester, and polystyrene are suitable, and high-density polyethylene, an ethylene-propylene copolymer, and polypropylene are more suitable.

The labeled molded body can be obtained by, for example, extrusion blow molding which involves pressure-bonding a melted resin parison to the inner wall of a mold by compressed air, stretch-blow molding using a preform, or injection molding which involves injecting a thermoplastic resin composition for molded body production into a mold with an injection device, followed by cooling for solidification. The label and the RFID member are disposed in a mold in advance, whereby the RFID member and the label can be attached at the same time with molding.

The labeled molded body may be obtained by differential pressure molding. The label and the RFID member are placed on the inner surface of a lower female mold of differential pressure molding molds. Then, the label is fixed to the inner wall of the mold by suction. Subsequently, a thermoplastic resin composition for molded body production is directed to above the lower female mold, and the label may be integrally fused to the outer wall of a molded article by differential pressure. The differential pressure molding can adopt any of vacuum molding and compressed air molding. In general, differential pressure molding using both the techniques in combination and using plug assist is preferred.

In any of these molding methods, the label bonded to the RFID member in advance may be provided, and the label can be disposed in a mold such that a surface on the side opposite to the RFID member comes into contact with the inner wall of the mold, followed by molding. Alternatively, the RFID member may be disposed on the label in a mold, and the thermoplastic resin composition can then be introduced into the mold and thereby molded. The adhesive strength between the molded body and an RFID inlay is attributed to the compatibility between the thermoplastic resin contained in the outermost layer of the molded body and a thermoplastic resin contained in a surface in contact with the outermost layer of the molded body, such as a support member layer or an encapsulating resin of the RFID inlay. The adhesive strength between the molded body and an RFID circuit is attributed to the compatibility or affinity between the thermoplastic resin contained in the outermost layer of the molded body and a conductive particles, a binder, or the like contained in an antenna of the RFID circuit. Hence, the adhesive strength between the molded body and the RFID member can be kept low by using resins having low compatibility with each other.

When the label has a heat sealing layer, the RFID member may be bonded to or disposed on a surface of the heat sealing layer.

The molded body of the present embodiment is not limited by its shape and includes various molded bodies obtained by the production methods mentioned above. Examples thereof include molded bodies in various shapes such as bottles, cups, squeeze containers, container lids, and boxes.

The labeled molded body can be conveniently separated into the molded body, the label, and the RFID member by a general recycling process. The general recycling process involves pulverizing a recovered used molded body into flakes with a pulverizer, and then separating between the molded body and the label through the use of the difference in specific gravity. The labeled molded body is subjected to a pulverization step in which the label is easily detached from the molded body. In this respect, an IC chip or RFID antenna portion contained in the RFID member is also separated from the flakes of the molded body or the label having a distinctive specific gravity. As a result, the molded body flakes or the label flakes can be recovered with good purity, and high recyclability can be achieved.

EXAMPLES

Hereinafter, the present embodiment and other embodiments will be described further specifically with reference to Examples. However, the present invention is not limited by Examples given below. In Examples, terms such as "part" and "%" mean the terms on a mass basis unless otherwise specified. The quantitative ratio (unit: "part by mass" or "% by mass") of a starting material used as a solution or a dispersion is a value in terms of a solid content.

[Production of Labeled Molded Body with RFID Member Bonded or Disposed]

Labeled molded bodies of Examples 1 to 21 and Comparative Examples 1 and 2 were produced in accordance with procedures described below. The details of materials used in each of these Examples and Comparative Examples are summarized in Table 1.

The types and blending ratios (% by mass) of materials used in label production, and the thicknesses of a heat sealing layer and a coating layer in each of these Examples and Comparative Examples are summarized in Table 2. The symbols described in Table 2 correspond to the symbols described in Table 1.

Aside from this, 19% by mass of a crystalline polypropylene resin PP-2, 19% by mass of a crystalline polypropylene resin-incompatible thermoplastic resin HDPE-1, 59.5% by mass of an inorganic filler CaCO3-2, 0.5% by mass of a dispersant D-1, and 2% by mass of a dispersant D-2 were melt-kneaded as materials for porous heat sealing layer formations in an extruder set to 250° C., and the resultant was extruded into a sheet via a die and laminated to one surface of the MD uniaxially stretched film. The resultant was directed to between a metal cooling roll provided with gravure emboss of #150 line, and a matte rubber roll such that the porous heat sealing layer side was in contact with the metal cooling roll. While both the layers

TABLE 1

| Material | Symbol | Material |
|---|---|---|
| Propylene-based resin (crystalline polypropylene) | PP-1 | Propylene homopolymer (trade name: NOVATEC PP FY6, manufactured by Japan Polypropylene Corp., MFR: 2.5 g/10 min (JIS-K7210), melting point: 164° C. (JIS-K7121)) |
| | PP-2 | Propylene homopolymer (trade name: NOVATEC PP FY4, manufactured by Japan Polypropylene Corp., MFR: 5 g/10 min (JIS-K7210), melting point: 164° C. (JIS-K7121)) |
| Ethylene-based resin (thermoplastic resin incompatible with crystalline polypropylene) | HDPE-1 | High-density polyethylene (trade name: NOVATEC HD HJ590N, manufactured by Japan Polyethylene Corp., MFR: 40 g/10 min (JIS-K7210), melting point: 133° C. (JIS-K7121)) |
| Ethylene-based resin | m-PE | Metallocene-based polyethylene (trade name: KERNEL KS571, manufactured by Japan Polyethylene Corp., MFR: 12 g/10 min (JIS-K7210), melting point: 100° C. (JIS-K7121)) |
| Inorganic filler | CaCO3-1 | Fine powder of heavy calcium carbonate (trade name: SOFTON #1800, manufactured by Bihoku Funka Kogyo Co., Ltd., volume-average particle size: 1.8 μm) |
| | CaCO3-2 | Fine powder of light calcium carbonate (trade name: KALFAIN YM23, manufactured by Maruo Calcium Co., Ltd., average particle size: 0.23 μm) |
| Dispersant | D-1 | Oleic acid (trade name: LUNAC O-A, manufactured by Kao Corp., melting point: 5° C. (JIS-K7121) |
| | D-2 | Maleic acid-modified polypropylene (trade name: MODIC P908, manufactured by Mitsubishi Chemical Corp., softening point: 140° C. (JIS-K7121)) |
| Polar resin | PEI | Cationic water-soluble binder polyethyleneimine (trade name: EPOMIN P-1000, manufactured by Nippon Shokubai Co., Ltd., solid concentration: 30% by mass) |
| Pressure-sensitive adhesive | G-1 | Strong adhesion-type acrylic pressure-sensitive adhesive (trade name: OLIVEIN BPS5160, manufactured by Toyo Chemical Co., Ltd., solid concentration: 33% by mass) |
| | G-2 | Re-peeling-type acrylic pressure-sensitive adhesive (trade name: OLIVEIN BPS5330, manufactured by Toyo Chemical Co., Ltd., solid concentration: 40% by mass) |
| Resin for molded body formation | PP-3 | Propylene homopolymer (trade name: NOVATEC PP MA3, manufactured by Japan Polypropylene Corp., MFR: 11 g/10 min (JIS-K7210), melting point: 164° C. (JIS-K7121)) |
| | HDPE-2 | High-density polyethylene (trade name: NOVATEC HD HJ490, manufactured by Japan Polyethylene Corp., MFR: 20 g/10 min (JIS-K7210), melting point: 133° C. (JIS-K7121)) |
| | EPCP | Ethylene-propylene copolymer (trade name: NOVATEC PP EG8B, manufactured by Japan Polypropylene Corp., MFR: 0.8 g/10 min (JIS-K7210), melting point: 142° C. (JIS-K7121)) |
| | HDPE-3 | High-density polyethylene (trade name: NOVATEC HD HB420, manufactured by Japan Polyethylene Corp., MFR: 0.2 g/10 min (JIS-K7210), melting point: 133° C. (JIS-K7121)) |

Example 1

70% by mass of a polypropylene resin PP-1 and 30% by mass of an inorganic filler CaCO3-1 were melt-kneaded as materials for substrate layer formations in an extruder set to 250° C., and the resultant was extruded into a sheet via a die and cooled to 70° C. in a cooling device to obtain a single-layer non-stretched film. This non-stretched film was heated to 145° C. and then stretched 5-fold in the machine direction through the use of the difference in circumferential velocity among many rolls to obtain a MD uniaxially stretched film.

were joined by pressing, an emboss pattern was transferred to the porous heat sealing layer side and cooled with the cooling roll to obtain a laminate having a two-layer structure.

The obtained laminate was heated to 153° C. using an oven, then stretched 9-fold in the transverse direction using a tenter stretching machine, and subsequently heat-treated at 170° C. to obtain a laminated resin film composed of substrate layer (biaxially stretched layer)/porous heat sealing layer (uniaxially stretched layer) (third aspect: a label having a substrate layer and a brittle heat sealing layer). The obtained laminated resin film had a thickness of 105 μm in which the porous heat sealing layer had a thickness of 6 μm. The porous heat sealing layer had a porosity of 60%.

Next, an RFID inlay with an antenna and an IC chip mounted on a polyethylene terephthalate support (support thickness: 60 μm, antenna thickness: 20 μm, IC chip thickness: 140 μm) was coated, as an RFID member, on the antenna- and IC chip-mounted surface with a pressure-sensitive adhesive G-1 using a bar coater. This coated surface was bonded to the porous heat sealing layer surface of the laminated resin film, and the resultant was punched into a 70 mm×90 mm rectangle to obtain an RFID inlay-bonded label.

Subsequently, an injection molding machine (manufactured by Niigata Machine Techno Co., Ltd., equipment name: MDV50ST-S7000) and molds (size: 128 mm×148 mm) capable of forming a plate-shaped molded body were used. The label was disposed on one of the molds such that the heat sealing layer faced the cavity side (molded body resin side). The label was fixed to the mold by suction. Then, the molds were clamped, and the resin PP-3 for molded body formation described in Table 1 was melted at 200° C. and injection-molded at an injection pressure of 30 MPa in the molds. Subsequently, the molds were cooled for 8 seconds with cooling water of 20° C. "INJ" in Table 2 represents injection molding. The molds thus cooled were released to obtain a labeled molded body of the third aspect.

Example 2

A labeled molded body of the third aspect was obtained by label preparation and molding in the same manner as in Example 1 except that the resin HDPE-2 for molded body formation described in Table 1 was used instead of the resin PP-3 for molded body formation.

Example 3

An RFID inlay-bonded label was produced in the same manner as in Example 1 except that the size of the label was changed to a 120 mm×150 mm rectangle. A molded body was obtained by an extrusion blow molding method given below instead of injection molding. "Blow" in Table 2 represents extrusion blow molding.

An extrusion blow molding machine (manufactured by Tahara Machinery Ltd., equipment name: TPF-706B-E1) and molds capable of forming a 3 L (internal capacity) container were used. The label was disposed on one of the molds such that the porous heat sealing layer faced the cavity side (molded body resin side). The label was fixed to the mold by suction. Then, a resin EPCP for molded body formation was melted at 200° C., extruded into a parison, and introduced to between the split molds. Then, the split molds were clamped. Subsequently, compressed air of 0.5 MPa was supplied into the parison so that the parison was swollen and brought into tight contact with the molds and thereby prepared into a container while bonded to the label. Subsequently, the split molds were cooled for 20 seconds with cooling water of 20° C. The molds thus cooled were released to obtain a labeled molded body of the third aspect.

Example 4

A labeled molded body of the third aspect was obtained by label preparation and molding in the same manner as in Example 3 except that the resin HDPE-3 for molded body formation described in Table 1 was used instead of the resin EPCP for molded body formation.

Example 5

A labeled molded body of the third aspect was obtained by label preparation and molding in the same manner as in Example 4 except that CaCO3-1 was used instead of CaCO3-2 in the porous heat sealing layer.

Example 6

A labeled molded body of the third aspect was obtained by label preparation and molding in the same manner as in Example 4 except that G-2 was used instead of G-1 as the pressure-sensitive adhesive for the RFID inlay.

Example 7

70% by mass of a polypropylene resin PP-1 and 30% by mass of an inorganic filler CaCO3-1 were melt-kneaded as materials for substrate layer formations in an extruder set to 250° C., and the resultant was extruded into a sheet via a die and cooled to 70° C. in a cooling device to obtain a single-layer non-stretched film. This non-stretched film was heated to 145° C. and then stretched 5-fold in the machine direction through the use of the difference in circumferential velocity among many rolls to obtain a MD uniaxially stretched film.

The obtained MD uniaxially stretched film was heated to 153° C. using an oven, then stretched 9-fold in the transverse direction using a tenter stretching machine, and subsequently heat-treated at 170° C. to obtain a biaxially stretched resin film serving as a substrate layer. This substrate layer had a thickness of 95 μm.

One surface of the obtained substrate layer was subjected to corona discharge treatment using a corona discharge treatment device (manufactured by Kasuga Denki, Inc., equipment name: HF400F). For the corona discharge treatment, the gap between a 0.8 m long aluminum discharge electrode and a treater roll was set to 5 mm, a line processing speed was set to 15 m/min, and an applied energy density was set to 4200 J/m$^2$. Next, the surface subjected to the corona discharge treatment was coated with a coating layer material PEI (30% by mass in an aqueous solution) such that a solid content after drying was 0.2 g/m$^2$. The coating was performed using a bar coater. The surface thus coated was dried in an oven to obtain a laminated resin film (first aspect: label having a coating layer on a substrate layer surface). This coating layer had a thickness of 0.2 μm. Subsequently, a label was prepared using the same RFID inlay as in Example 1. The label was disposed such that the coating layer faced the cavity side (molded body resin side). The label was fixed onto a mold by suction. Then, injection molding was performed in the same manner as in Example 1 to obtain a labeled molded body of the first aspect.

Example 8

A labeled molded body of the first aspect was obtained in the same manner as in Example 7 except that the resin HDPE-2 for molded body formation described in Table 1 was used instead of the resin PP-3 for molded body formation.

Example 9

70% by mass of a polypropylene resin PP-1 and 30% by mass of an inorganic filler CaCO3-1 were melt-kneaded as materials for substrate layer formations in an extruder set to 250° C., and the resultant was extruded into a sheet via a die and cooled to 70° C. in a cooling device to obtain a single-layer non-stretched film. This non-stretched film was heated to 145° C. and then stretched 5-fold in the machine direction through the use of the difference in circumferential velocity among many rolls to obtain a MD uniaxially stretched film.

Aside from this, m-PE described in Table 1 was melt-kneaded as a material for heat sealing layer formation in an extruder set to 190° C., and the resultant was extruded into a sheet via a die and laminated to one surface of the MD uniaxially stretched film. The resultant was directed to between a metal cooling roll provided with gravure emboss of #150 line, and a matte rubber roll such that the heat sealing layer side was in contact with the metal cooling roll. While both the layers were joined by pressing, an emboss pattern was transferred to the heat sealing layer side and cooled with the cooling roll to obtain a laminate having a two-layer structure.

Subsequently, the laminate was heated to 153° C. using an oven, then stretched 9-fold in the transverse direction using a tenter stretching machine, and subsequently heat-treated at 170° C. to obtain a laminated resin film composed of substrate layer (biaxially stretched layer)/heat sealing layer (uniaxially stretched layer). The obtained laminated resin film had a thickness of 105 μm in which the heat sealing layer had a thickness of 3 μm.

The heat sealing layer surface of the obtained laminated resin film was subjected to corona discharge treatment using a corona discharge treatment device (manufactured by Kasuga Denki, Inc., equipment name: HF400F). For the corona discharge treatment, the gap between a 0.8 m long aluminum discharge electrode and a treater roll was set to 5 mm, a line processing speed was set to 15 m/min, and an applied energy density was set to 4200 J/m². Next, the surface subjected to the corona discharge treatment was coated with a coating layer material PEI (30% by mass in an aqueous solution) such that a solid content after drying was 0.2 g/m². The coating was performed using a bar coater. The surface thus coated was dried in an oven to obtain a laminated resin film having the substrate layer and the heat sealing layer and having the coating layer on the molded body-side surface of the heat sealing layer (second aspect). This heat sealing layer had a thickness of 3 μm, and the coating layer had a thickness of 0.2 μm.

Subsequently, a labeled molded body of the second aspect was obtained by label preparation and molding in the same manner as in Example 1.

Example 10

A laminated resin film composed of substrate layer (biaxially stretched layer)/porous heat sealing layer (uniaxially stretched layer) (third aspect: a label having a substrate layer and a brittle heat sealing layer) was obtained in the same manner as in Example 1 except that the laminate was heated to 158° C. at the time of stretching in the transverse direction. The obtained laminated resin film had a thickness of 105 μm in which the porous heat sealing layer had a thickness of 6 μm. The porous heat sealing layer had a porosity of 45%.

Subsequently, an RFID inlay-bonded label was obtained, and a labeled molded body of the third aspect was obtained using an injection molding machine, in the same manner as in Example 1.

Example 11

A laminated resin film composed of substrate layer (biaxially stretched layer)/porous heat sealing layer (uniaxially stretched layer) (third aspect: a label having a substrate layer and a brittle heat sealing layer) was obtained in the same manner as in Example 4 except that the laminate was heated to 158° C. at the time of stretching in the transverse direction. The obtained laminated resin film had a thickness of 105 μm in which the porous heat sealing layer had a thickness of 6 μm. The porous heat sealing layer had a porosity of 45%.

Subsequently, an RFID inlay-bonded label was obtained, and a labeled molded body of the third aspect was obtained using an extrusion blow molding machine, in the same manner as in Example 4.

Comparative Example 1

Label preparation and molding were performed in the same manner as in Example 9 except that the heat sealing layer surface of the laminated resin film was not subjected to corona treatment; and no coating layer was formed.

Example 12

A laminated resin film composed of substrate layer (biaxially stretched layer)/porous heat sealing layer (uniaxially stretched layer) (third aspect: a label having a substrate layer and a brittle heat sealing layer) was obtained in the same manner as in Example 1.

Next, a conductive paste (manufactured by Asahi Chemical Research Laboratory Co., Ltd., trade name: LS 453-1) was applied onto the porous heat sealing layer surface of the laminated resin film to form a 10 μm thick antenna. A 140 μm thick IC chip was connected to the antenna via an anisotropically conductive adhesive (manufactured by Nippon Chemical Industrial Co., Ltd., trade name: SMERF®), and the resultant was punched into a 70 mm×90 mm rectangle to obtain an RFID circuit-bonded label.

Subsequently, an injection molding machine (manufactured by Niigata Machine Techno Co., Ltd., equipment name: MDV50ST-S7000) and molds (size: 128 mm×148 mm) capable of forming a plate-shaped molded body were used. The label was disposed on one of the molds such that the heat sealing layer faced the cavity side (molded body resin side). The label was fixed to the mold by suction. Then, the molds were clamped, and the resin PP-3 for molded body formation described in Table 1 was melted at 200° C. and injection-molded at an injection pressure of 30 MPa in the molds. Subsequently, the molds were cooled for 8 seconds with cooling water of 20° C. The molds thus cooled were released to obtain a labeled molded body of the third aspect.

Examples 13 to 21

The same laminated resin films as in Examples 2 to 5 were used in Examples 13 to 16, respectively. The same laminated resin films as in Examples 7 to 9 were used in Examples 17 to 19, respectively. The same laminated resin films as in Examples 10 and 11 were used in Examples 20 and 21, respectively. The same RFID circuit-bonded labels as in Example 12 were obtained by the same method as in Example 12 except that these laminated resin films were used. Then, labeled molded bodies were obtained in the same manner as in Examples 2 to 5 for Examples 13 to 16, Examples 7 to 9 for Examples 17 to 19, and Examples 10 and 11 for Examples 20 and 21.

Comparative Example 2

Label preparation and molding were performed in the same manner as in Example 18 except that the heat sealing layer surface of the laminated resin film was not subjected to corona treatment; and no coating layer was formed.

Evaluation Method (Thicknesses of Label and RFID Member)

The thicknesses of the label and the RFID member were measured in accordance with JIS K7130: 1999 using a constant-pressure thickness gauge (manufactured by Teclock Corp., "PG-01J").

(Thicknesses of Heat Sealing Layer and Coating Layer)

The label prepared in each of Examples and Comparative Examples was embedded in an epoxy resin and solidified. Then, a cut surface parallel to the thickness direction of the label (i.e., perpendicular to the surface direction) was prepared using a microtome. This cut surface was metallized by metal evaporation. Then, the cross-sectional thicknesses of the heat sealing layer and the coating layer were photographed at a 3000× magnification under a scanning electron microscope (manufactured by JEOL Ltd., equipment name: NeoScope JCM-6000) to measure thicknesses.

(Cross-Sectional Porosity of Porous Heat Sealing Layer)

The cross-sectional image obtained as described above was subjected to binarization and image processing using an image analyzer (manufactured by Nireco Corp., equipment name: LUZEX IID) to determine a porosity. The area of a porous region laid out by the thermoplastic resin composition was divided by the area of the whole observation region, and the resulting value was calculated as a cross-sectional porosity. The inorganic filler in a pore observed in the cross-sectional image was regarded as the pore.

(Adhesive Strength Evaluation)

The labeled molded bodies of Examples 1 to 11 and Comparative Example 1 were each stored in an environment of 23° C. and 50% relative humidity for 1 week. Then, in accordance with JIS K6854-3: 1999, a label-attached portion of the molded body was cut into a 15 mm wide strip, and the adhesive strength between the label and the molded body and the adhesive strength between the label and the RFID inlay were determined by T-shaped peeling at a tensile strength of 300 mm/min using a tensile tester (manufactured by A&D Co., Ltd., equipment name: TENSILON RTG-1225). The adhesive strength between the RFID inlay and the molded body was very small and was thus impossible to evaluate. The RFID inlay was detached from the molded body when the 15 mm wide strip sample was cut out of the molded body/RFID inlay/label sequentially laminated portion. Also, the label and the RFID inlay were detached from the molded body when the molded body/RFID inlay/label sequentially laminated portion was cut. This suggests that the support of the RFID inlay was a polyethylene terephthalate (polar resin) film whereas the resin for molded body formation was polyolefin (non-polar resin); thus, these resins were rarely (substantially not) bonded to each other.

On the other hand, the adhesive strength between the label and the RFID circuit was measured for Examples 12 to 21 and Comparative Example 2 as follows: when the molded body/RFID circuit/label sequentially laminated portion was cut out of the labeled molded body as described above, the molded body was detached so that only an RFID circuit/label laminate remained. Meanwhile, a double-faced tape was applied to a support to obtain a support for measurement. The laminate and the support for measurement were affixed to each other such that the RFID circuit faced the double-faced tape. The adhesive strength was measured by T-shaped peeling of the label from the support for measurement at a tensile strength of 300 mm/min. The measurement width was measured and converted to a measurement value in terms of a width of 15 mm, and the resulting value was regarded as the adhesive strength between the label and the RFID circuit.

(Pulverization Evaluation of Labeled Molded Body)

1.5 kg of the labeled molded body obtained in each of Examples and Comparative Examples was provided and pulverized using a pulverizer (Morita Seiki K.K., equipment name: XL-15). The powder thus pulverized was recovered, and the pulverized state was visually confirmed. Whether the RFID member (RFID inlay or RFID circuit) and the label were bonded to the molded body was confirmed.

Releasability of the label: A sample assessed as A1 or A2 was confirmed to be suitable for practical use.

A1: The label was peeled from the molded body, whereas the heat sealing layer was thin and remained on the molded body surface.

A2: The label was peeled from the molded body, and neither the heat sealing layer nor a label-derived layer remained on the molded body surface.

C: The label was not peeled from the molded body.

Releasability of the RFID member (RFID inlay or RFID circuit): A sample assessed as A1, A2, or A3 was confirmed to be suitable for practical use.

A1: The RFID member was peeled from the molded body and bonded to the label.

A2: The RFID member was peeled from the molded body and also partially peeled from the label.

A3: The RFID member was peeled from the molded body and also peeled from the label.

C: The RFID member was not peeled from the molded body.

Evaluation

Table 2 shows the configurations and evaluation results of the labeled molded bodies of Examples 1 to 11 and Comparative Example 1.

TABLE 2

| | | | Example 1 | Example 2 | Example 3 | Example 4 | Example 5 | Example 6 |
|---|---|---|---|---|---|---|---|---|
| Label | Substrate layer material | PP-1 (mass %) | 70 | 70 | 70 | 70 | 70 | 70 |
| | | CaCO3-1 (mass %) | 30 | 30 | 30 | 30 | 30 | 30 |

TABLE 2-continued

| | | | | | | | |
|---|---|---|---|---|---|---|---|
| Heat sealing layer material | PP-2 (mass %) | 19 | 19 | 19 | 19 | 19 | 19 |
| | HDPE-1 (mass %) | 19 | 19 | 19 | 19 | 19 | 19 |
| | m-PE-2 (mass %) | — | — | — | — | — | — |
| | CaCO3-1 (mass %) | — | — | — | — | 59.5 | — |
| | CaCO3-2 (mass %) | 59.5 | 59.5 | 59.5 | 59.5 | — | 59.5 |
| | D-1 | 0.5 | 0.5 | 0.5 | 0.5 | 0.5 | 0.5 |
| | D-2 | 2 | 2 | 2 | 2 | 2 | 2 |
| Coating layer material | PEI (mass %) | — | — | — | — | — | — |
| | Thickness of heat sealing layer (μm) | 6 | 6 | 6 | 6 | 6 | 6 |
| | Porosity of heat sealing layer (%) | 60 | 60 | 60 | 60 | 54 | 60 |
| | Thickness of coating layer (μm) | — | — | — | — | — | — |
| RFID inlay | Pressure-sensitive adhesive | | | G-1 | | | G-2 |
| Molded body | Molding method | INJ | INJ | Blow | Blow | Blow | Blow |
| | Thermoplastic resin | PP-3 | HDPE-2 | EPCP | HDPE-3 | HDPE-3 | HDPE-3 |
| Adhesive strength [gf/15 mm] | RFID inlay-label ($P_{inlay\text{-}label}$) | 270 | 270 | 270 | 270 | 300 | 150 |
| | Molded body-RFID inlay ($P_{molded\ body\text{-}inlay}$) | Not measurable (50 gf or less) | Not measurable (50 gf or less) | Not measurable (50 gf or less) | Not measurable (50 gf or less) | Not measurable (50 gf or less) | Not measurable (50 gf or less) |
| | Molded body-label ($P_{molded\ body\text{-}label}$) | 190 | 240 | 130 | 150 | 260 | 150 |
| Pulverization evaluation | Releasability of label | A1 | A1 | A1 | A1 | A1 | A1 |
| | Releasability of RFID inlay | A2 | A2 | A2 | A2 | A2 | A3 |

| | | | Example 7 | Example 8 | Example 9 | Comparative Example 1 | Example 10 | Example 11 |
|---|---|---|---|---|---|---|---|---|
| Label | Substrate layer material | PP-1 (mass %) | 70 | 70 | 70 | 70 | 70 | 70 |
| | | CaCO3-1 (mass %) | 30 | 30 | 30 | 30 | 30 | 30 |
| | Heat sealing layer material | PP-2 (mass %) | — | — | — | — | 19 | 19 |
| | | HDPE-1 (mass %) | — | — | — | — | 19 | 19 |
| | | m-PE-2 (mass %) | — | — | 100 | 100 | — | — |
| | | CaCO3-1 (mass %) | — | — | — | — | — | — |
| | | CaCO3-2 (mass %) | — | — | — | — | 59.5 | 59.5 |
| | | D-1 | — | — | — | — | 0.5 | 0.5 |
| | | D-2 | — | — | — | — | 2 | 2 |
| | Coating layer material | PEI (mass %) | 100 | 100 | 100 | — | — | — |
| | | Thickness of heat sealing layer (μm) | — | — | 3 | 3 | 6 | 6 |
| | | Porosity of heat sealing layer (%) | — | — | 0 | 0 | 45 | 45 |
| | | Thickness of coating layer (μm) | 0.2 | 0.2 | 0.2 | — | — | — |
| RFID inlay | Pressure-sensitive adhesive | | | | G-1 | | | |
| Molded body | Molding method | | INJ | INJ | INJ | INJ | INJ | Blow |
| | Thermoplastic resin | | PP-3 | HDPE-2 | PP-3 | PP-3 | PP-3 | HDPE-3 |
| Adhesive strength [gf/15 mm] | RFID inlay-label ($P_{inlay\text{-}label}$) | | 400 | 400 | 400 | 400 | 330 | 330 |
| | Molded body-RFID inlay ($P_{molded\ body\text{-}inlay}$) | | Not measurable (50 gf or less) | Not measurable (50 gf or less) | Not measurable (50 gf or less) | Not measurable (50 gf or less) | Not measurable (50 gf or less) | Not measurable (50 gf or less) |
| | Molded body-label ($P_{molded\ body\text{-}label}$) | | 110 | 100 | 190 | 800 | 230 | 280 |

TABLE 2-continued

| Pulverization evaluation | Releasability of label | A2 | A2 | A2 | C | A1 | A1 |
|---|---|---|---|---|---|---|---|
| | Releasability of RFID inlay | A1 | A1 | A1 | A1 | A2 | A2 |

Table 3 shows the configurations and evaluation results of the labeled molded bodies of Examples 12 to 21 and Comparative Example 2.

TABLE 3

| | | | Example 12 | Example 13 | Example 14 | Example 15 | Example 16 | Example 17 |
|---|---|---|---|---|---|---|---|---|
| Label | Substrate layer material | PP-1 (mass %) | 70 | 70 | 70 | 70 | 70 | 70 |
| | | CaCO3-1 (mass %) | 30 | 30 | 30 | 30 | 30 | 30 |
| | Heat sealing layer material | PP-2 (mass %) | 19 | 19 | 19 | 19 | 19 | — |
| | | HDPE-1 (mass %) | 19 | 19 | 19 | 19 | 19 | — |
| | | m-PE-2 (mass %) | — | — | — | — | — | — |
| | | CaCO3-1 (mass %) | — | — | — | — | 59.5 | — |
| | | CaCO3-2 (mass %) | 59.5 | 59.5 | 59.5 | 59.5 | — | — |
| | | D-1 | 0.5 | 0.5 | 0.5 | 0.5 | 0.5 | — |
| | | D-2 | 2 | 2 | 2 | 2 | 2 | — |
| | Coating layer material | PEI (mass %) | — | — | — | — | — | 100 |
| | | Thickness of heat sealing layer (μm) | 6 | 6 | 6 | 6 | 6 | — |
| | | Porosity of heat sealing layer (%) | 60 | 60 | 60 | 60 | 54 | — |
| | | Thickness of coating layer (μm) | — | — | — | — | — | 0.2 |
| Molded body | | Molding method | INJ | INJ | Blow | Blow | Blow | INJ |
| | | Thermoplastic resin | PP-3 | HDPE-2 | EPCP | HDPE-3 | HDPE-3 | PP-3 |
| Adhesive strength [gf/15 mm] | | RFID circuit-label ($P_{circuit\text{-}label}$) | 110 | 110 | 110 | 110 | 160 | 380 |
| | | Molded body-RFID circuit ($P_{molded\ body\text{-}circuit}$) | Not measurable (50 gf or less) | Not measurable (50 gf or less) | Not measurable (50 gf or less) | Not measurable (50 gf or less) | Not measurable (50 gf or less) | Not measurable (50 gf or less) |
| | | Molded body-label ($P_{molded\ body\text{-}label}$) | 190 | 240 | 130 | 150 | 260 | 110 |
| Pulverization evaluation | | Releasability of label | A1 | A1 | A1 | A1 | A1 | A2 |
| | | Releasability of RFID circuit | A3 | A3 | A3 | A3 | A2 | A1 |

| | | | Example 18 | Example 19 | Comparative Example 2 | Example 20 | Example 21 |
|---|---|---|---|---|---|---|---|
| | Label | Substrate layer material | PP-1 (mass %) | 70 | 70 | 70 | 70 | 70 |
| | | | CaCO3-1 (mass %) | 30 | 30 | 30 | 30 | 30 |
| | | Heat sealing layer material | PP-2 (mass %) | — | — | — | 19 | 19 |
| | | | HDPE-1 (mass %) | — | — | — | 19 | 19 |
| | | | m-PE-2 (mass %) | — | 100 | 100 | — | — |
| | | | CaCO3-1 (mass %) | — | — | — | — | — |
| | | | CaCO3-2 (mass %) | — | — | — | 59.5 | 59.5 |
| | | | D-1 | — | — | — | 0.5 | 0.5 |
| | | | D-2 | — | — | — | 2 | 2 |
| | | Coating layer material | PEI (mass %) | 100 | 100 | — | — | — |

TABLE 3-continued

| | | | | | | |
|---|---|---|---|---|---|---|
| | Thickness of heat sealing layer (μm) | — | 3 | 3 | 6 | 6 |
| | Porosity of heat sealing layer (%) | — | 0 | 0 | 45 | 45 |
| | Thickness of coating layer (μm) | 0.2 | 0.2 | — | — | — |
| Molded body | Molding method | INJ | INJ | INJ | INJ | Blow |
| | Thermoplastic resin | HDPE-2 | PP-3 | PP-3 | PP-3 | HDPE-3 |
| Adhesive strength [gf/ 15 mm] | RFID circuit-label ($P_{circuit\text{-}label}$) | 380 | 380 | 170 | 240 | 240 |
| | Molded body-RFID circuit ($P_{molded\ body\text{-}circuit}$) | Not measurable (50 gf or less) | Not measurable (50 gf or less) | Not measurable (50 gf or less) | Not measurable (50 gf or less) | Not measurable (50 gf or less) |
| | Molded body-label ($P_{molded\ body\text{-}label}$) | 100 | 190 | 800 | 230 | 280 |
| Pulverization evaluation | Releasability of label | A2 | A2 | C | A1 | A1 |
| | Releasability of RFID circuit | A1 | A1 | A1 | A2 | A2 |

In Examples 1 to 6, 10, and 11, the state of the labeled molded body after pulverization showed that the porous heat sealing layer that underwent cohesive failure remained thinly on the surface of crushed molded body pieces, whereas neither the substrate layer of the label nor the RFID inlay existed thereon. In Examples 1 to 5, the RFID inlay adhered to the crushed label pieces because the RFID inlay was bonded to the label. However, the brittle heat sealing layer was broken by shear at the time of the crushing test so that some RFID inlay pieces were peeled from the label pieces. In Example 6, the label pieces and the RFID inlay pieces after pulverization were able to be completely separated by changing the adhesive for the RFID inlay to easy-adhesion type.

In Examples 12 to 16, 20, and 21, the state of the labeled molded body after pulverization showed that the porous heat sealing layer that underwent cohesive failure remained thinly on the surface of crushed molded body pieces, whereas neither the substrate layer of the label nor the RFID circuit existed thereon. In Examples 12 to 16, the RFID circuit adhered to the crushed label pieces because the RFID circuit was bonded to the label. However, the brittle heat sealing layer was broken by shear at the time of the crushing test so that some RFID circuit pieces were peeled from the label pieces.

On the other hand, in all the cases of Examples 1 to 6, 10, 11, 12 to 16, 20, and 21, the RFID member (RFID inlay or RFID circuit) was completely peeled from the molded body by the pulverization test. As mentioned above, the adhesive strength between the RFID member and the molded body was very small, and the RFID member was detached from the molded body when a measurement sample containing the RFID member was cut into a 15 mm wide strip (along the shape of the RFID circuit in Examples 12 to 21 and Comparative Example 2). The adhesive strength between the molded body and the RFID member was not measurable (presumably was 50 gf/15 mm or less), also suggesting that in Examples 1 to 6, 10, 11, 12 to 16, 20, and 21, the molded body and the RFID member were rarely (substantially not) bonded to each other.

In the labeled molded bodies of the first aspect in Examples 7, 8, 17, and 18 and the labeled molded bodies of the second aspect in Examples 9 and 19, the label was completely peeled from the molded body by the pulverization test, and neither the heat sealing layer nor a label-derived layer remained on the surface of the molded body pieces. This was presumably because the polar resin contained in the coating layer exhibited no adhesiveness to the main component polyolefin (non-polar resin) of the molded body; thus, the coating layer played a role in reducing the adhesiveness between the label and the molded body and adjusting the adhesive strength therebetween to the range defined by the present invention.

Examples 7 and 8 were similar in the adhesive strength between the RFID inlay and the molded body to Examples 1 to 6, and the RFID inlay was completely peeled from the molded body by the pulverization test. Examples 17 and 18 were similar in the adhesive strength between the RFID circuit and the molded body to Examples 12 to 16, and the RFID circuit was completely peeled from the molded body by the pulverization test. Since the RFID member (RFID inlay or RFID circuit) and the label were relatively firmly bonded to each other, the RFID circuit adhered to the crushed label pieces or was also peeled from the crushed label pieces.

The labeled molded bodies of Comparative Examples 1 and 2 had higher adhesive strength between the label and the molded body than that of Examples 1 to 21. This was presumably because the heat sealing layer was firmly bonded to the molded body. Furthermore, the labeled molded bodies of Comparative Examples 1 and 2 failed separation between the label and the molded body after the pulverization test.

DESCRIPTION OF SYMBOLS

1: labeled molded body
10: RFID member
20: label
21: substrate layer
22: coating layer
23, 23*a*, and 23*b*: heat sealing layer
24: printed layer
30: molded body

The invention claimed is:

1. A labeled molded body comprising:
a molded body,
a label disposed on a surface of the molded body, and
an RFID member disposed between the molded body and the label, wherein
the molded body is in contact with the RFID member,
the molded body is in contact with the label,
the molded body comprises a thermoplastic resin at least in a surface layer, the label has a substrate layer comprising a thermoplastic resin, adhesive strength between the molded body and the RFID member ($P_{molded\ body-member}$) is 90 gf/15 mm or less and is equal to or less than adhesive strength between the RFID member and the label ($P_{member-label}$), and adhesive strength between the molded body and the label ($P_{molded\ body-label}$) is 100 to 300 gf/15 mm.

2. The labeled molded body according to claim 1, wherein the label has a heat sealing layer, and the label and the molded body are thermally fused through the heat sealing layer.

3. The labeled molded body according to claim 2, wherein the heat sealing layer is a porous layer.

4. The labeled molded body according to claim 3, wherein the porous layer is an stretched layer of a resin composition comprising a thermoplastic resin and a filler.

5. The labeled molded body according to claim 1, wherein the label has a coating layer on an outermost surface on the molded body side.

6. The labeled molded body according to claim 5, wherein the coating layer of the label is in contact with the molded body.

7. The labeled molded body according to claim 5, wherein the coating layer is a layer containing a polar resin having no heat sealability or a peeling varnish layer, wherein the layer containing a polar resin having no heat sealability is a resin having a glass transition temperature of 100° C. or higher, or a resin having no melting point.

8. The labeled molded body according to claim 7, wherein the polar resin having no heat sealability is an ethylene-imine-based resin or cationic polymer antistatics having an ammonium salt structure or a phosphonium salt structure.

9. The labeled molded body according to claim 1, wherein the RFID member is bonded to the label directly or via an additional layer.

10. The labeled molded body according to claim 9, wherein the adhesive strength between the molded body and the RFID member ($P_{molded\ body-member}$) is smaller than the adhesive strength between the RFID member and the label ($P_{member-label}$).

11. The labeled molded body according to claim 1, wherein both of the adhesive strength between the RFID member and the molded body ($P_{molded\ body-member}$), and the adhesive strength between the RFID member and the label ($P_{member-label}$) are 50 gf/15 mm or less.

12. The labeled molded body according to claim 1, wherein the RFID member is an RFID inlay, and adhesive strength between the molded body and the RFID inlay ($P_{molded\ body-inlay}$) is 100 gf/15 mm or less and is equal to or less than adhesive strength between the RFID inlay and the label ($P_{inlay-label}$).

13. The labeled molded body according to claim 1, wherein the RFID member is an RFID circuit, and adhesive strength between the molded body and the RFID circuit ($P_{molded\ body-circuit}$) is 100 gf/15 mm or less and is equal to or less than adhesive strength between the RFID circuit and the label ($P_{circuit-label}$).

\* \* \* \* \*